United States Patent [19]

Elsässer et al.

[11] Patent Number: 4,843,500
[45] Date of Patent: Jun. 27, 1989

[54] DISK STORAGE DRIVE

[75] Inventors: Dieter Elsässer, St. Georgen; Johann von Der Heide, Schramberg, both of Fed. Rep. of Germany

[73] Assignee: Papst-Motoren GmbH & Co. KG, St. Georgen, Fed. Rep. of Germany

[21] Appl. No.: 38,049

[22] Filed: Apr. 14, 1989

Related U.S. Application Data

[63] Continuation-in-part of Ser. No. 767,671, Aug. 21, 1985, Pat. No. 4,658,312, which is a continuation of Ser. No. 412,093, Aug. 27, 1982, abandoned.

[30] Foreign Application Priority Data

Sep. 7, 1981 [DE] Fed. Rep. of Germany ....... 3135385

[51] Int. Cl.$^4$ ..................... G11B 5/012; H02K 17/00
[52] U.S. Cl. .................................. 360/97.02; 310/156; 360/99.11
[58] Field of Search ..................... 360/97–99; 310/156

[56] References Cited

U.S. PATENT DOCUMENTS 3,329,845  7/1967  Lear .
3,596,121  7/1971  Chang .
4,005,490  1/1977  Duncan et al. .
4,031,558  6/1977  Kusaka .
4,062,049  12/1977  Dirks .
4,275,339  6/1981  Burke et al. .
4,607,182  8/1986  Ballhaus ............................ 360/97 X
4,672,487  6/1987  Brand ................................. 360/97

Primary Examiner—A. J. Heinz
Attorney, Agent, or Firm—Fitch, Even, Tabin & Flannery

[57] ABSTRACT

A disk memory drive includes a brushless drive outer rotor motor having an internal space and a stator with windings. The outer rotor coaxially encircles the stator and a substantially cylindrical air gap is defined between the stator and the rotor. The rotor includes permanent magnets and a hub. A disk mounting section is provided on the hub for accommodating at least one storage disk positioned in a clean chamber, the mounting section being adapted to extend through a central aperture of the storage disk. The windings and the magnets interacting with the windings are disposed for at least half of the axial extension thereof within a space surrounded by the disk mounting section of the hub. Bearings rotatably mount the rotor and the hub.

16 Claims, 8 Drawing Sheets

DISK STORAGE DRIVE

This application is a continuation-in-part of application Ser. No. 767,671, filed Aug. 21, 1985, now U.S. Pat. No. 4,658,312, issued Apr. 14, 1987 which is a continuation of application Ser. No. 412,093, filed Aug. 27, 1982 now abandoned.

BACKGROUND OF THE INVENTION

The invention relates to a disk storage drive for receiving at least one storage disk having a central opening, with an outer rotor type driving motor having a rotor casing mounted by means of a shaft in a bearing system so as to rotate relative to a stator and on which can be placed the storage disk for driving by the rotor casing, as described in U.S. Pat. application Ser. No. 353,584, now U.S. Pat. No. 4,438,542, issued Mar. 27, 1984.

The content of this patent is incorporated herein by reference to avoid unnecessary repetition. It relates to a disk store and storage drive for receiving at least one storage disk having a central opening. The driving motor extends coaxially at least partly through the central opening of the storage disk, and means are provided for connecting the storage disk and the driving motor rotor.

BRIEF SUMMARY OF THE INVENTION

One problem of the present invention is to further simplify the construction of a disk store described in the aforementioned U.S. Pat. No. 4,438,542, while improving its operation. In particular, the storage disk is to be reliably protected against undesired influencing by the magnetically active parts of the driving motor. In addition, a particularly space-saving and robust construction of the driving motor are to be achieved.

According to the invention, this problem is solved in that at least the part of the rotor casing receiving the storage disk is made from a non-ferromagnetic material and carries the shaft directly or by means of a hub and in that a magnetc shield made from a ferromagnetic material in the form of a drawn can projects into the storage disk receiving part of the rotor casing and is connected thereto. The shielding surrounds the periphery of the magnetically active parts of the driving motor and also envelops the parts at one end. The shield has a central opening whose edge is directly radially adjacent the shaft or parts of the driving motor carrying or supporting the shaft. A rotor casing constructed in this way can be easily manufactured, and it effectively protects the magnetically sensitive storage disks, particularly magnetic hard storage disks, against magnetic stray flux emanating from the magnetically active parts of the driving motor. The shield is preferably in the form of a deep-drawn can, and the part of the rotor casing receiving the storage disk can be made from a lightweight metal by die casting.

If, in the manner described in the aforementioned U.S. Pat. No. 4,438,542, the driving motor is constructed as a brushless direct current motor with a permanent magnet rotor, then in accordance with a further development of the invention a printed circuit board with at least one rotary position detector and perhaps other electronic components for the control and regulation of the driving motor are mounted on the side of the stator remote from the bottom of the shielding can. This ensures that the rotary position detector and any further circuit components of the magnetic shielding arrangement do not interfere with the rotating parts.

Further advantageous developments of the invention also are disclosed, including features that contribute to a compact construction of the disk storage drive. In connection with disk storage drives of the present type, high demands are made on the concentricity of the storage disks. It is therefore generally necessary to machine the storage disk receiving part or to work it in some other way so that it is dimensionally true. As a result of other features of the invention, the necessary machining is reduced to a relatively small part of the circumferential surface of the storage disk receiving part and a trouble-free engagement of a storage disk on the shoulder of the storage disk receiving part is permitted.

Other features of the claimed invention provide a robust precision mounting support for utilizing the available axial overall length for maximizing the distance between the bearings; and permit particularly large distances between the bearings where the axial installation area between a mounting or assembly flange and the end of the storage disk receiving part is limited. Installation space is available on the other side of this flange. Still other features provide for alternative solutions leading to particularly small radial runouts of the rotor; ensure a space-saving housing of the circuit board; and for solutions where importance is attached to a particularly shallow construction.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
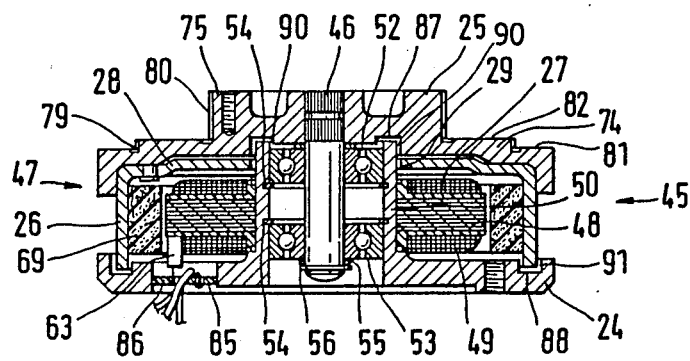
FIG. 1 is a vertical partial sectional view through a first embodiment of the invention along the line I—I of FIG. 2.

The disk storage drive illustrated in FIG. 1, having an extremely shallow construction, has a brushless direct current motor 45 having a rotor casing 47 fixed to and coaxial with a rotor shaft 46. A stator lamination 48, carrying a stator winding 49, is mounted on a bearing tube 50. The rotor shaft 46 is rotatably mounted within the bearing tube 50 by means of two bearings 52 and 53. These are kept axially spaced by a pair of retaining rings 54. A cup spring 55 is supported on the underside of the bearing 53 by a retaining ring 56 resting on the rotary shaft 46, so that the bearings 52, 53 are axially braced relative to one another. The bearings 52, 53 are pressed into the bearing tube 50 at the time of assembly. Together with an assembly flange 24, the bearing tube 50 forms a one-piece die casting.

The rotor casing 47 comprises a storage disk receiving part 25 and a shielding can 26, which are joined together, for example, by riveting. The storage disk receiving part 25 is made from a non-ferromagnetic material, preferably lightweight metal. The rotor shaft 46 is pressed into a central opening of the storage disk receiving part 25. As an alternative, the shaft can be cast into the receiving part.

The shielding can 26 is made from a ferromagnetic material and can in particular be constructed as a soft iron deep-drawn part. A plurality of permanent magnetic segments or a one-part permanent magnet 69 are fixed to the inner face of shielding can 26 radially facing the stator lamination 48. The permanent magnet 69 preferably comprises a mixture of hard ferrite, for example, barium ferrite, and an elastic material. Thus, it is a so-called rubber magnet. The latter is trapezoidally or approximately trapezoidally radially magnetized via the pole pitch in a motor construction having a relatively small pole clearance. At the same time, the shielding can 26 forms the magnetic return path for magnet 69. The shielding can 26 surrounds the magnetically active parts 48, 49, 69 of the driving motor 45 on the periphery thereof, as well as on one end thereof. The bottom 28 of shielding can 26 is adapted to the shape of the coil winding heads 27 of the stator winding 49 and contains a central opening 29, whose edge is in the immediate radial vicinity of the circumferential surface of the bearing tube 50. In this way, the shielding can effectively prevents the magnetic flux from straying towards the outside of the storage disk receiving part 25.

The storage disk receiving part 25 has two stepped stages 74 and 75, each of whose circumferential surfaces in the present embodiment carry a plurality of radially distributed and projecting bearing webs 79 or 80. The outsides of bearing webs 79, 80 are ground in a dimensionally true manner to accommodate the internal diameter of the hard storage disks to be placed on the receiving part 25. The stepped stages 74, 75 form shoulders 81, 82 and are provided respectively with an annular recess 83 and 84 at the foot axially of bearing webs 79, 80. This structure ensures that storage disks mounted on the bearings webs 79, 80, and having either one of two opening diameters, will cleanly engage against either the shoulder 81 or 82.

The assembly flange 24 is provided with a recess 85 in which is housed a printed circuit board 86. This printed circuit board carries a rotary position detector, for example a Hall IC, as well as other circuit components for the control and regulation of the driving motor 45. The Hall IC 63 extends up axially from the circuit board 86 to the immediate vicinity of the stator lamination 48. The permanent magnet 69 projects axially over the stator lamination 48 in the direction of circuit board 86 until it partly overlaps the Hall IC 63. In this way, the Hall IC 63 or, if desired, some other magnetic field-dependent semi-conductor component, determines the rotary position of the rotor of the driving motor 45.

In the illustrated embodiment, the two bearings 52, 53 are spaced approximately the same axial distance from the axial center of the permanent magnet 69 and the stator lamination 48.

Disk storages are most usually operated in "clean room" environments to protect them against contaminants. By means of the assembly flange 24, the storage drive is arranged on a partition (not shown) which separates the ultra-clean area for receiving the storage disks from the remainder of the interior of the equipment. Dirt particles, grease vapors and the like from bearing 52 and parts of the driving motor 45 are prevented from passing into the storage disk receiving area by labyrinth seals 90 and 91. The labyrinth seal 90 is formed in that the end of the bearing tube 50 away from the assembly flange 24 that projects into an annular slot 87 on the inside of the storage disk receiving part 25, accompanied by the formation of sealing gaps. Similarly, for forming the labyrinth seal 91, the end of the shield can 26 projects into the annular slot 88 of the assembly flange 24. The labyrinth seals 90, 91 are preferably dimensioned in the manner described in the aforementioned U.S. Pat. No. 4,438,542.

Figure 2:
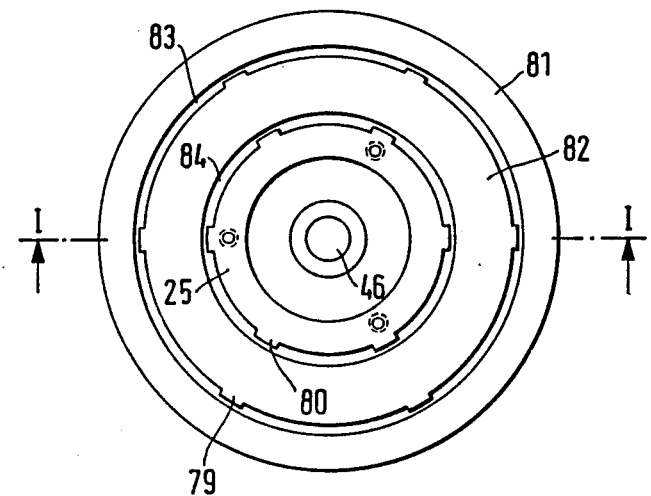
FIG. 2 is a plan view of the arrangement of FIG. 1.
Figure 3:
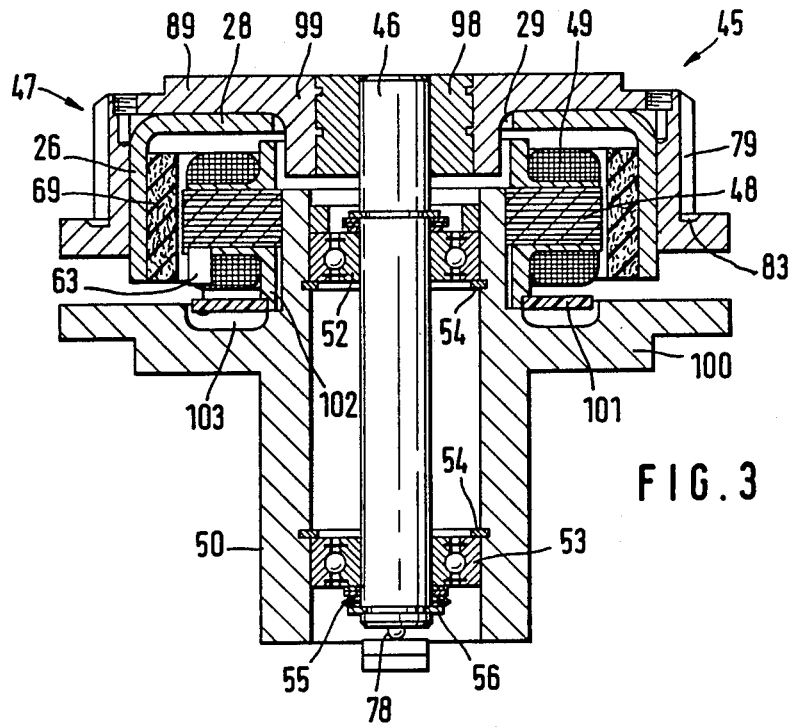
FIG. 3 is a sectional view through another embodiment of the invention with an extended bearing tube.

The embodiment of FIG. 3 differs from the arrangement according to FIGS. 1 and 2 in that storage disks having the same opening diameters are placed on bearing webs 79 of a storage disk receiving part 89, which surrounds the majority of the axial dimension of the magnetic shielding can 26. In other words, the magnetically active parts 48, 49, 69 of the driving motor 45 are partially located within the central opening of the storage disk. A bush-like hub 98 is pressed or cast into the storage disk receiving part 89. The rotor shaft 46 is then pressed into the hub 98. The edge of the central opening 29 in the bottom 28 of the shielding can 26 extends up to the portion 99 of the receiving part 89 which received the hub 98.

The bearing tube 50 projects in the axial direction on the side of the assembly flange 100 remote from the stator lamination 48. As a result, a particularly large axial spacing between the two bearings 52, 53 can be achieved. Axially, bearing 52 is in the vicinity of the axial center of the permanent magnet 69 and of the stator lamination 48. The axial spacing between bearings 52 and 53 is equal to or larger than double the bearing external diameter. To prevent electrical charging of the rotor which in operation rotates at high speed and which would disturb the operational reliability of the disk storage device, the rotor shaft 46 is electrically conductively connected to the equipment chassis by means of a bearing ball 78 and a spring contact (not shown). The printed circuit board 101, carrying the rotary position detector 63 and the other electronic components, is supported on the end of a spacer ring 102 facing an assembly flange 100 and is located between the flange and the stator lamination 48. An annular slot 103 is formed in assembly flange 100 and is aligned with the annular circuit board 101. The annular slot 103 provides space for receiving the wire ends and soldered connections projecting from the underside of the circuit board 101.

Figure 4:
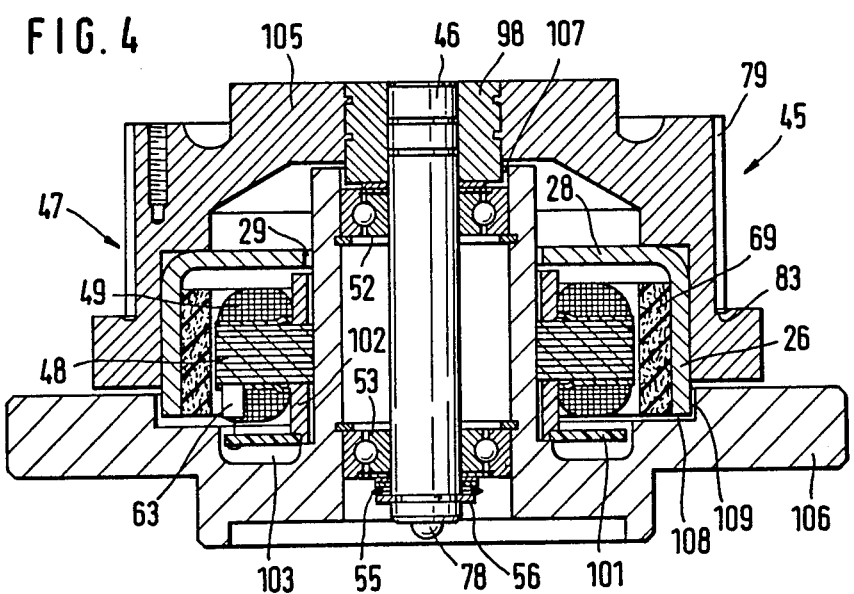
FIG. 4 is a sectional view through a further embodiment of the invention.

FIG. 4 shows an embodiment in which a storage disk receiving part 105 is axially extended in order to be able to house a larger number of storage disks than in the arrangement of FIG. 3. The bearing tube 50 is correspondingly axially extended in order to be able to use the existing installation space with a view to a maximum axial spacing between the bearings 52 and 53. The end of the bearing tube 50, remote from as assembly flange 106, embraces the hub 98 connecting the receiving part 105 and the shaft 46, accompanied by the formation of a labyrinth seal 107. The edge of the central opening 29 of shielding can 26 extends up close to the outside of the bearing tube 50. The free end of the shielding can 26 engages a recess 108 in the assembly flange 106. As a result, a further labyrinth seal 109 is formed. This embodiment otherwise corresponds to the structures described hereinbefore.

In a further development of the invention, a disk storage drive of the type disclosed in copending U.S. application Ser. No. 733,231, filed May 10, 1985, now U.S. Pat. No. 4,779,165, is considered. Some such disk storage drives have stationary shafts, and it has been found that the construction of components of these drives accommodated in the sealed internal space of the motor, particularly the rotational position sensor device and/or the commutation electronics attached thereto, and/or the stator winding, presents problems. Connections for these internal components are led out above the shaft. This requires, however, an additional processing of the shaft, which may weaken the mechanical strength of the shaft. This weakening can, because of the small dimensions in the radial direction available within the hub, be pronounced and undesirable.

A problem that forms the basis of this further development of the invention is that of further constructing a disk storage drive in accordance with the above copending application, which is provided with a stationary shaft, in such a manner that the undesirable weakening of the shaft can be partially or even entirely avoided.

In a first solution of this problem, the rotational position sensor device is located outside the sealed space.

This solution has an advantage that the connections of the rotational position sensor device do not need to be led out from the sealed internal space of the motor. Furthermore, adjustments which might likewise become necessary can easily be carried out from a readily accessible point. Also, the changing of the rotational position sensor device can be readily accomplished.

If the rotational position sensor device has several rotational position sensors, preferably magnetic field-sensitive rotational position sensors, these are advantageously supported by a common molded piece, which may be made by injection-molding. The construction of the molded piece for the accommodation of several rotational position sensors in accordance with the invention simply ensures the precise mutual alignment of these sensors.

The rotational position sensor device can, if necessary, together with the commutation electronics of the motor be mounted on a printed circuit board. This printed circuit board can be supported on a stationary flange connected to the shaft. The connecting leads of the rotational position device can be conducted through the shaft.

The control device, preferably constructed in the form of a control magnet device, can be mounted on the external side of a motor cover sealing of the internal space of the motor. The cover can, however, also be mounted on a part of the hub lying at a distance from the disk support section, which is located outside the sealed motor inner space. A flange serving for the support of the storage disk or storage disks can be connected in a single piece with the remaining parts of the hub, or be part of a cover closing off the internal space of the motor.

In a second solution of the problem, at least the lead wire of the stator winding is conducted over a bearing support ring, from the sealed internal space of the motor. This eliminates the need for leading through the winding connections in the shaft. This second solution can be applied in connection with the previously stated first solution. It is also possible to accommodate the rotational position device and, if necessary, the commutator electronics as well within the sealed internal space of the motor and to construct the connections of the same also over the bearing ring support. In one solution as well as the other, the stationary shaft can be supported completely free of such arrangements. It consequently remains unweakened, and also requires no additional processing of the shaft.

The bearing support ring can be prefabricated, and be provided with recesses, through which the connections can be conducted. The bearing support ring can also be cast in situ around the pertinent connections.

Figure 5:
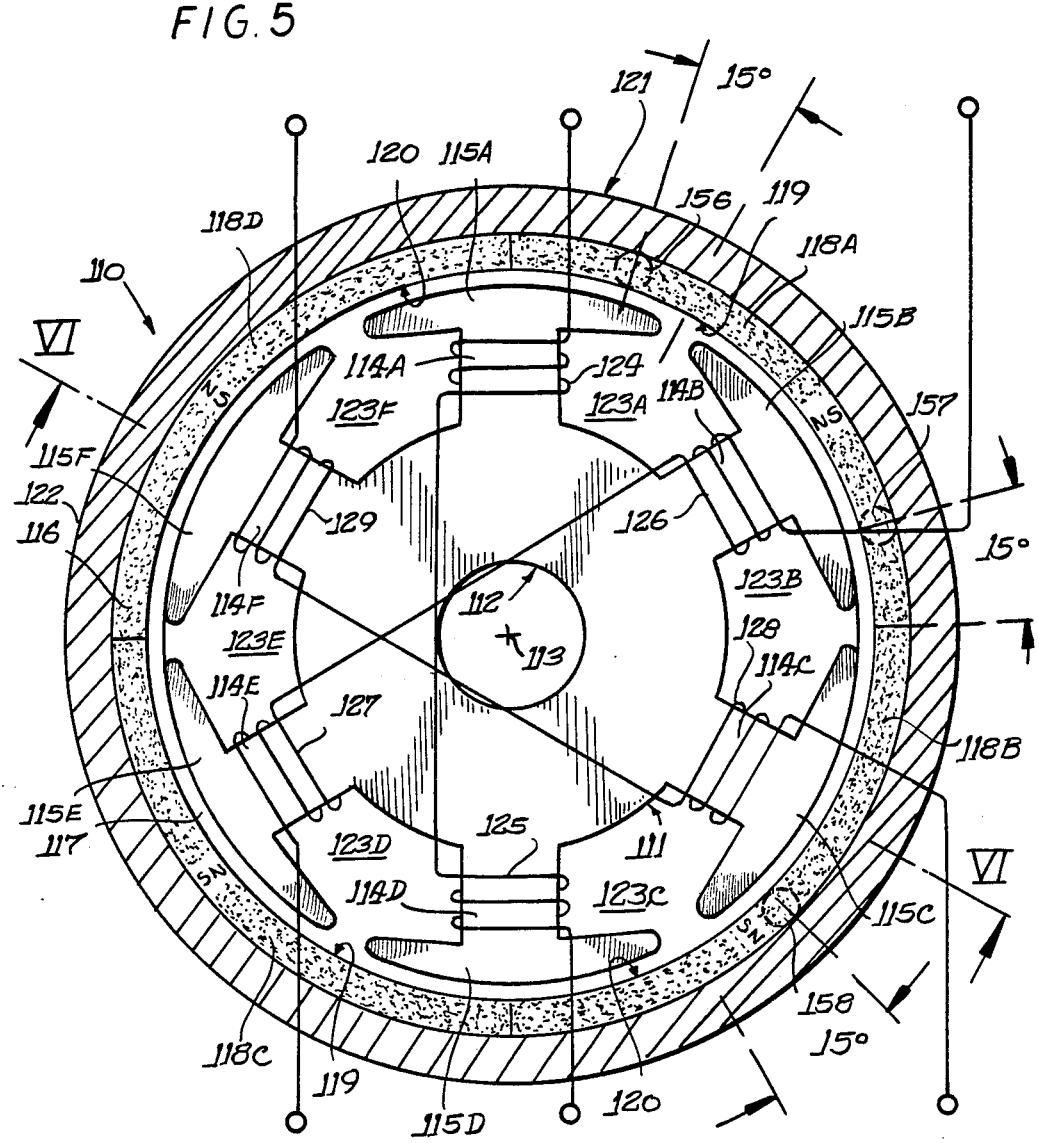
FIG. 5 is a section through a disk storage drive according to the invention along line V—V of FIG. 6.
Figure 6:
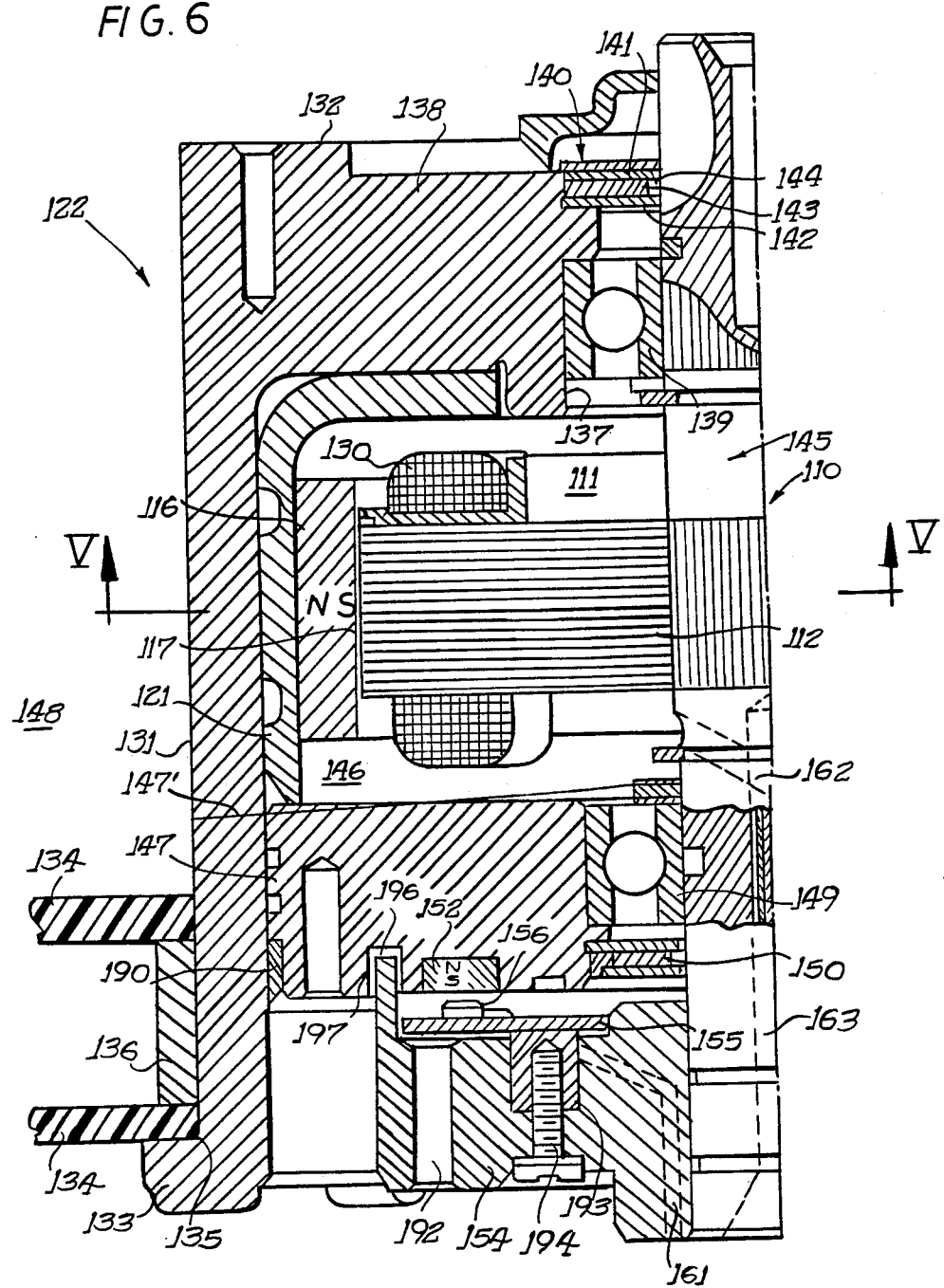
FIG. 6 is a diagrammatic section along line VI—VI of FIG. 5 and illustrating an externally located rotational position sensor device.

Referring once again to the drawings, the brushless drive motor, designated as 110 in FIGS. 5 and 6, has a stator 111 with a stator lamination stack 112. The stator lamination stack 112 is laid out radially symmetrical in regard to a central rotational axis 113, and forms six stator poles 114A to 114F, which, in the view from above in accordance with FIG. 5, is an essentially T-shaped form, and are positioned at a mutual angular distance of 60°. Instead of one lamination stack, for example, a sintered iron core can also be provided. Pole shoe units 115A to 115F, together with a permanent magnetic rotor magnet 116, define an essentially cylindrical air gap 117. The rotor magnet 116 is radially magnetized in four poles in its circumferential direction, in the manner indicated in FIG. 5; that is to say, it has four sections 118A to 118D, and, on the internal side of the annular rotor magnet 116 toward the air gap 117 there are positioned, in alternating sequence, two magnetic north poles 119 and two magnetic south poles 120. The poles 119, 120 have, in the example depicted, a width of essentially 180°-el (corresponding to 90° mechanical). Thus, in the circumferential direction of the air gap 117, an approximately rectangular or trapezoidal magnetization is obtained. The rotor magnet 116 is mounted in an external rotor casing 121 of slightly magnetic material, preferably steel, which serves as a magnetic return path and as a magnetic shield. This may be glued into the casing. The casing 121 and the magnet 116 together form an external rotor 122. The rotor magnet 116 can include in particular a rubberized magnetic unit, or a plastic-bound magnet. Instead of a single-piece magnetic ring, shell-shaped magnetic segments can also be glued into the casing 121, or attached there in another way. Particularly well suited materials for the magnetic ring or magnetic segments are magnetic materials in a synthetic bonding agent; a mixture of hard ferrite, and elastomer materials, ceramic magnetic materials, or samarium cobalt.

The stator poles 114A to 114F abut a total of six stator grooves 123A to 123F. A three-phase stator winding is inserted into these grooves. Each of the three phases comprises two 120°-el fiberized coils 124, 125; 126, 127; and 128, 129, each of which is wound around one of the stator poles 114A to 114F. Both of the coils of each phase, which are connected in series, lie, as depicted in FIG. 5, above one another, in a diametrically opposed manner. The coils are preferably wound in a bifilar manner. As can be seen from the schematic depiction in FIG. 5, any overlapping between the coils 124 to 129 can be avoided. In this manner, particularly short coil ends 130 (FIG. 6) can be obtained. The grooves 123A to 123F can, in this construction, fill the stator windings in an outstanding manner. Fasteners for the groove apertures are, as a rule, not necessary.

A hub 132, not depicted in FIG. 5, which is provided with a cylindrical disk mounting section 131 consisting preferably of a light metal, especially aluminum or an aluminum alloy, can be set up on the external rotor casing 121. One or more storage disks 134 preferably magnetic or optical solid storage disks are provided on the disk mounting section 131, whereby the disk mounting section 131 engages through the conventional central aperture 135 of the storage disks. The lowest storage disk in FIG. 6 is positioned on a flange 133 of the hub 132 projecting radially outwardly. The storage disks 134 can be held, at mutual axial distances, by corresponding spacing devices 136, and secured to the hub 133 by means of a tightening device, not depicted, of a known type. In the form shown in FIG. 6, there are located the stator 111, with the stator lamination stack 112 and stator winding coils 124 to 129, as well as the rotor magnet 116, and the external rotor casing 121 which forms the iron shield, all completely within the space encircled by the disk mounting section 131 of the hub 132.

In a central aperture 137 of a frontal wall 138 of the hub 132, which is relatively sturdy for stability, are a ball bearing 139 and a magnetic fluid seal 140 on the side of the support which is axially oriented away from the drive motor 110. The seal 140 consists of two annular pole pieces 141, 142, a permanent magnet ring 143 located between both these pole pieces, and a magnetic fluid (not depicted), which is inserted into an annular gap 144 between the magnetic ring 143 and a stationary shaft 145. Seals of this type are known under the designation of "Ferrofluidic Seal". The internal space 146 of the motor is sealed on the side oriented away from the frontal wall 138 by means of a motor cover 147, which is inserted into the external rotor casing 121 and the hub 132, by means, for example, of adhesion. The motor cover 147 abuts with its cylindrical outer edge 147' the lower edge of the casing 121. This allows a particularly easy assembling of the cover 147 within hub 132. For sealing purposes, adhesive material 190 is placed in a circumferential groove 191 between the cover 147 and the hub 132.

The motor cover 147 is supported on the shaft 145 by means of an additional ball bearing support 149. On the side of the ball bearing support 149 away from the drive motor 110, there is a magnetic fluid seal 150, which has a construction corresponding to the seal 140. The seals 140, 150 ensure an effective sealing of the motor internal space 146, including the supports 139, 149, relative to the clear space 148 which accommodates the storage disks 134.

The motor cover 147 is provided on the frontal side oriented away from the drive motor 110 with an annular groove receiving a control magnet ring 152. The control magnet ring 152 has four sections of alternating axial magnetization corresponding to the rotor magnets 116, which run in sequence in the circumferential direction and extend over 90°, so that alternating north and south poles, aligned with poles 119, 120 in circumferential direction, are provided on the bottom side of the control magnetic ring 152.

A stationary flange 154 is disposed on the lower end of the shaft 145 in FIG. 6. The flange 154 is provided with threaded bores 192 for receiving fastening screws by which the disk storage drive may be connected to the chassis, for example, a wall adjoining the clean chamber 148, or the like. The flange 154 supports on its frontal side relative to the motor cover 147 a printed circuit board 155. Three rotational position sensors 156, 157, 158 are mounted on the printed circuit board 155. In the embodiment depicted, these magnetic field sensors may be Hall generators, Hall-IC's, field plates, magnetic diodes, or the like, which interact with the control magnet ring 152. The rotational position sensors 156, 157, 158 are suitably positioned in the circumferential direction with regard to the coils 124 to 129 so that the changes of the sensor switching conditions essentially coincide with the zero passages of current in the correspondingly positioned coils. This is attained, in accordance with the embodiment shown in FIG. 5, through the fact that the rotational position sensors are displaced by $15°_{mech}$ with regard to the center of the apertures of the stator grooves 123A to 123F. The rotational position sensors 156, 157, 158 may be supported (not shown) by a common molded part, preferably a plastic injection molded part. By using a common molded part as the support for the rotational position sensors their mutual positioning can be maintained and reproduced in a particularly precise manner. The printed circuit board 155 is fixed to a ring 193 and is tightly pulled against the flange 154 by screws 194 screwed into a ring 193. An upwardly projecting outer rim 195 of flange 154 defines a hollow cylinder extending into an annular groove 196 provided in the bottom side of the flange 154. Thereby a labyrinth gap 197 is formed which provides for additional sealing between the stationary flange 154 and the rotary motor cover 147.

The connections of the rotational position sensors 156, 157, 158 and/or commutational electronics likewise positioned on the printed circuit board are conducted through one or more apertures 161 of the flange 154 which open into peripheral cutouts of the ring 193. The connections of the stator winding coils 124 to 129 of the drive motor 110 are on the other hand conducted outwardly through bores 162, 163 of the stationary shaft 145 out of the internal space of the disk storage drive, which is sealed off by means of the magnetic fluid seals 140, 150. The bores 162, 163 can be dimensioned relatively closely, since they not only must accommodate the connections of the stator winding, but also the connections of the rotational position sensors and/or the commutation electronics (not shown). Furthermore, the rotational position sensor device 156 to 158 located outside of the sealed space 146 can be closely adjusted. An excessive weakening of the shaft 145 is thereby avoided.

Figure 7:
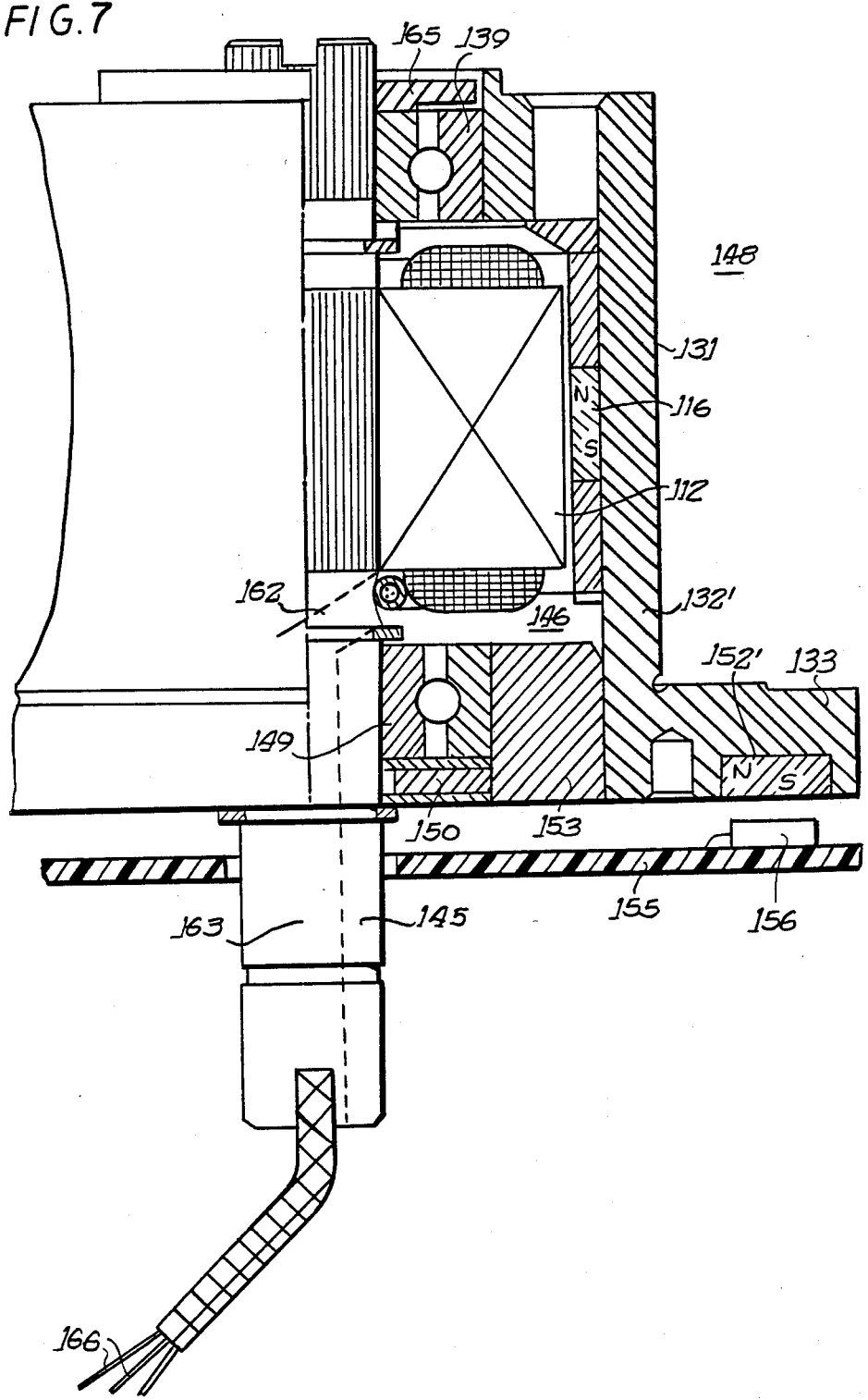
FIG. 7 is a section similar to FIG. 6 for a modified embodiment.

In the further modified embodiment in FIG. 7, the rotor magnet 116 is located directly within the hub 132', which itself forms the magnetic shield, and is made of magnetically conductive material, preferably steel. The control magnet ring 152' is located on the frontal side of the flange 133 facing away from the disk mounting section 131 of the hub 132', and alternately magnetized in the axial direction. In this embodiment, the rotational position sensors 156, 157, 158 are axially opposed to the control magnet ring 152'. The magnetic fluid seal 150 ensures, together with a labyrinth seal 165 which replaces the magnetic fluid seal 140 of the embodiment in FIG. 6, the sealing of the internal space 146, including the supports 139, 149 relative to the clean chamber 148. The connections of the stator winding 166 are conducted through the bores 162, 163 of the stationary shaft 145. It should be understood that, even in this embodiment, the rotational position sensors 156, 157, 158, can, if desired, be accommodated by a common support corresponding to the molded part 159, which support is attached to the printed circuit board 155.

If it is desirable to manufacture the hub 132' from magnetically non-conducting, or poorly conducting, materials, such as light metal, an additional iron shield can be provided. This can be seen in the embodiment in FIG. 8. There, the rotor magnet 116 is accommodated in an iron shielding ring 167. The flange 169 supporting the storage disk 134 forms a part, separated from the hub 132", of the cover 170 which accommodates the ball bearing support 149. The hub 132" and the cover 170 are closely connected with one another, so that the axial end section of the hub 132", which is oriented towards the cover 170, engages in an annular groove 171 of the cover 170.

Figure 9:
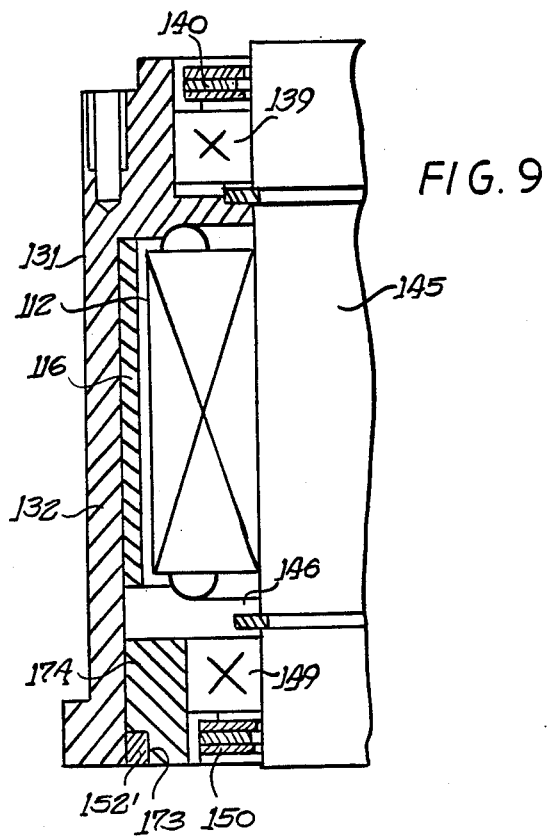
FIG. 9 is a section similar to FIG. 6 for yet another modified embodiment of the invention.
Figure 10:
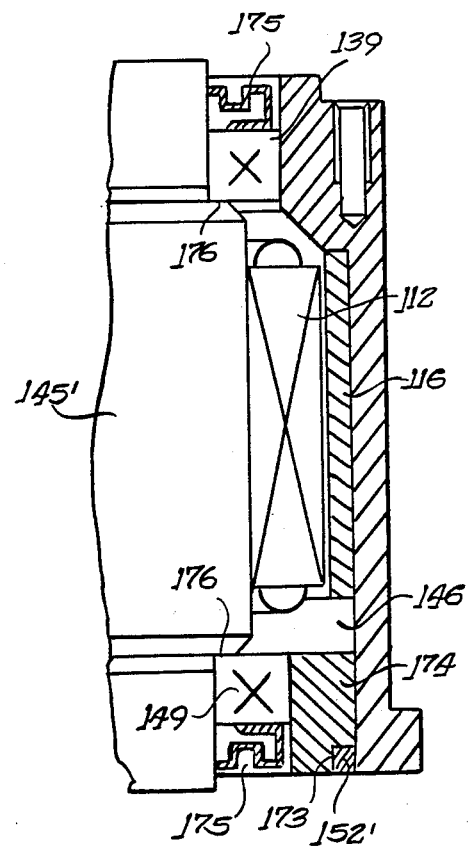
FIG. 10 is a section similar to FIG. 6 for yet another embodiment of the invention.

In both embodiments of FIGS. 9 and 10, the control magnet ring 152' is located in a groove 173 of a bearing support ring 174 on the end of the hub 132. The hub 132 forms the magnetic shield, and is correspondingly produced from conductive material, particularly steel. The control magnet ring 152' interacts, in the manner depicted in FIG. 7, with the rotational position sensors 156, 157, 158, which are not depicted in FIGS. 9 and 10. While in the embodiment in FIG. 9, the internal space 146 is sealed off by means of the magnetic fluid seals 140, 150, in the embodiment in FIG. 10, labyrinth seals 175 are provided in their place. The embodiment of FIG. 10 differs from that of FIG. 9 through the fact that the stationary shaft 145' in the area supporting the stator lamination stack 112, and the area directly adjoining the same axially, is thickened, so that the shaft 145 forms collar pieces 176, on which the ball bearing supports 139, 149 are supported.

Figure 8:
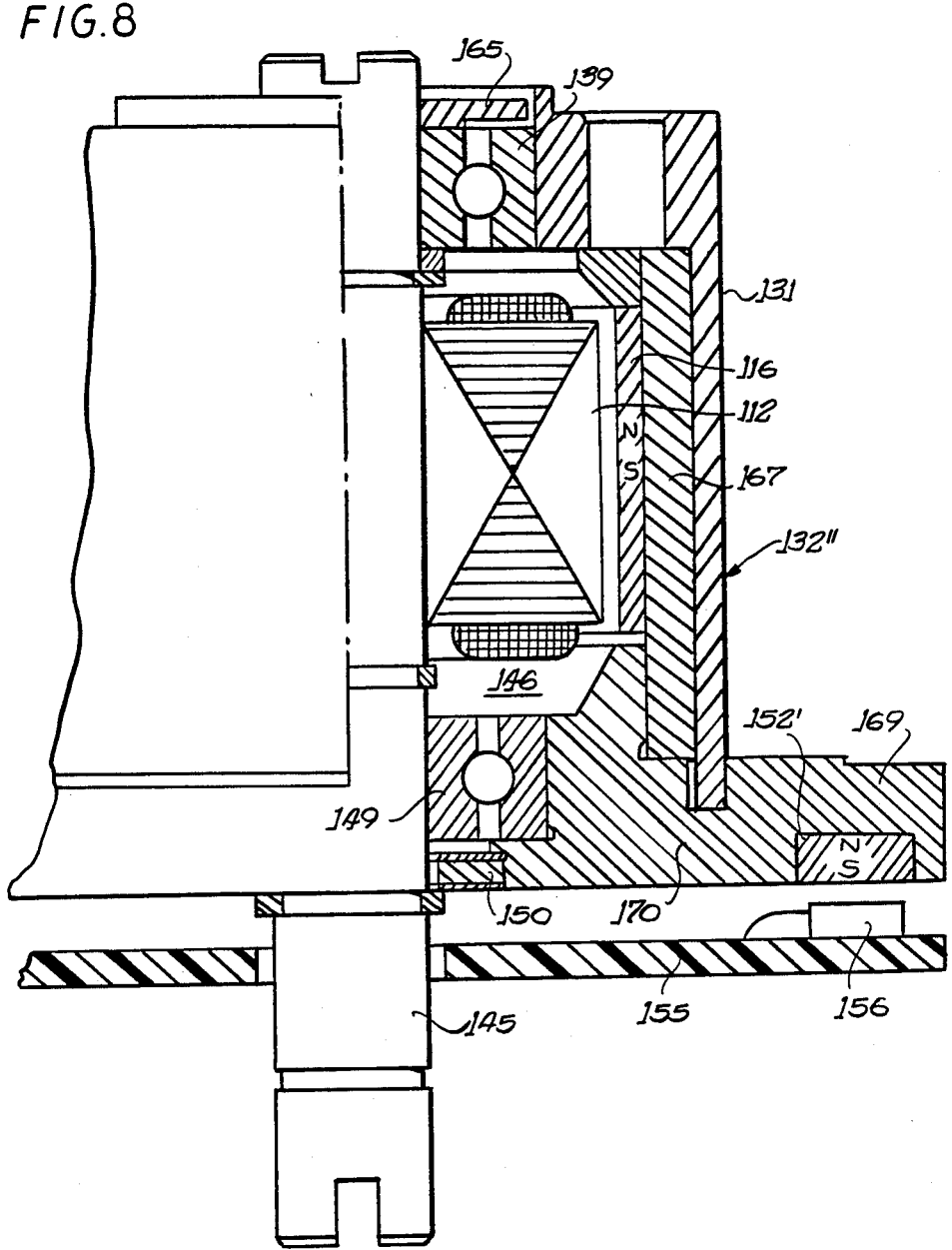
FIG. 8 is a section similar to FIG. 6 for another modified embodiment of the invention.

In the embodiments shown in FIGS. 8, 9, and 10, the connections of the stator winding are, in a manner preferably corresponding to FIGS. 6 and 7, conducted externally through recesses of the shafts 145 and 145'.

Figure 11:
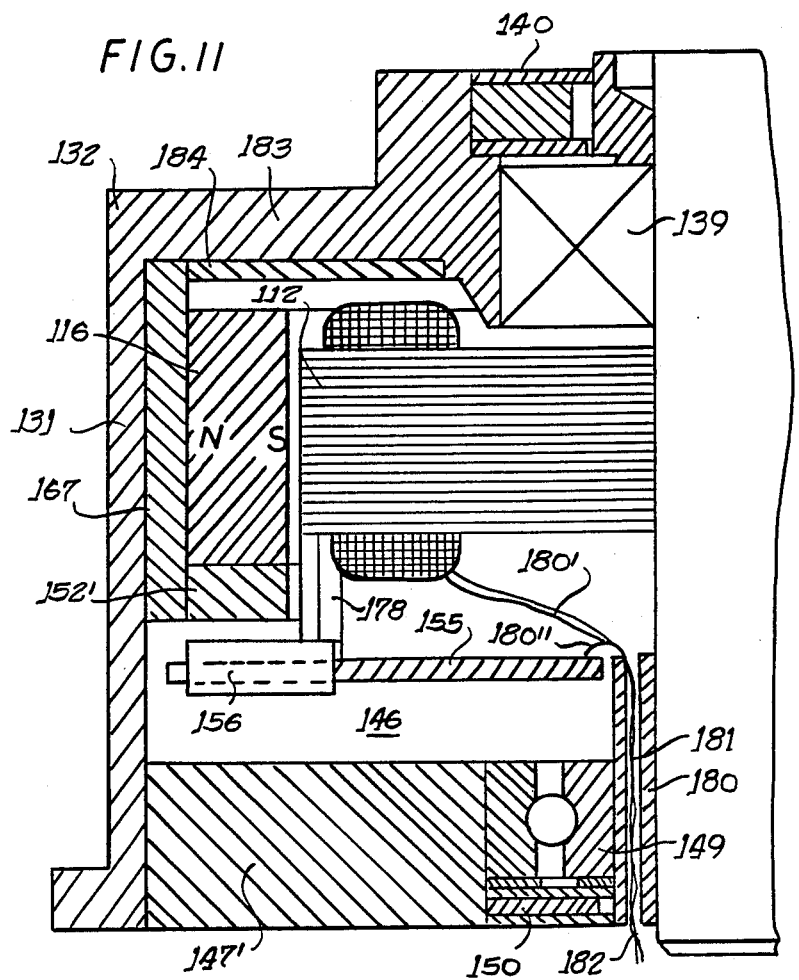
FIG. 11 is a section through a disk storage drive illustrating an internally located rotational position sensor device.

FIG. 11 depicts an embodiment similar to that of FIG. 11 of U.S. Pat. No. 4,779,165, which a soft magnetic yoke ring 167 is inserted in the hub 132, the latter comprising a disk mounting section 132 and preferably being made of light metal. The yoke ring 167 receives the rotor magnet 116 and the control magnet 152'. In this embodiment printed circuit board 155 carrying the rotational position sensors 156, 157, 158 is disposed within the space 146 sealed by magnetic fluid seals 140, 150. The circuit board 155 may be suspended from the stator lamination stack 112 by supports 178. A support ring 180 is provided for conducting outwardly the connections 180' of the stator winding as well as the connections 180" of the rotational position sensors 156, 157, 158 and/or electronic commutating means which likewise may be mounted on the printed circuit board 155. The support ring 180 is made of metal, preferably ferromagnetic metal, and surrounds the shaft 145". The ball bearing 149 and magnetic fluid seals 150 are disposed between the cover 147' and the support ring 180. At least one and preferably a plurality of axially extending apertures 181 are provided in the support ring 180 for receiving the aforementioned connections. After introduction of the connections, which together are indicated at 182, the apertures 181 are sealed, e.g. by a casting or adhesive material. This embodiment completely avoids bores in the stationary shaft 145". Therefore the strength of the shaft is not impaired. The provision of a metallic support ring 180 provides for a particularly small eccentricity or run-out of the rotating members.

Figure 12:
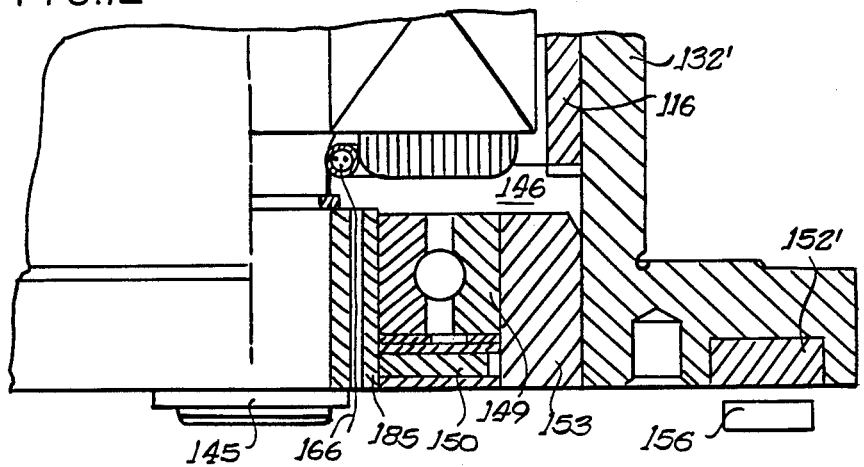
FIG. 12 is partial section similar to FIG. 7 for a further embodiment of the invention.

The embodiment of FIG. 12 corresponds to that of FIG. 7 with the exception that the connection 166 of the stator winding extends through a bearing support ring 185 rather than through the bores in the stationary shaft 145. The ring 185 surrounds the lower portion of the shaft 145. The ball bearing 149 and magnetic fluid seal 150 are disposed in the annular space between the support ring 185 and the ferromagnetic ring 153, which is inserted into hub 132'.

The ferromagnetic support ring 180 and the ferromagnetic ring 153, respectively, act as flux guide means for the magnetic field of the magnetic fluid seal 150.

Instead of providing the bearing support ring 185 with apertures for the connections, the bearing support ring can also be around the connections directly.

Furthermore, the invention is not restricted to the use of magnetic field-sensitive rotational position sensors. It can also be used, for example, with optical sensors.

While the invention has been described in connection with a preferred embodiment and certain alternatives, other alternatives, modifications, and variations may be apparent to those skilled in the art in view of the foregoing description. Accordingly, it is intended to embrace all such alternatives, modifications, and variations as fall within the spirit and scope of the appended claims.

We claim:

1. A disk memory drive comprising: a brushless drive motor having an internal space defined therein and a stator including winding means defining magnetically active parts of the drive motor and having a given axial extension, the motor having an outer rotor coaxially encircling the stator and a substantially cylindrical air gap defined between the stator and the rotor, the rotor including a hub and including permanent magnet means having a predetermined axial extension fixedly connected therewith for magnetic interaction with said winding means; a disk mounting section provided on the hub for accommodating at least one storage disk located in a clean chamber surrounding said rotor, the mounting section along its axial length being adapted to extend through a central aperture of the storage disk, the winding means and the magnet means interacting therewith being disposed for at least half of the axial extension thereof within a space surounded by the disk mounting section of the hub; and bearing means on a stationary shaft rotatably mounting the rotor and the hub on the shaft, the rotor also including rotational position indicator means interacting with stationary rotational position sensor means for determining the rotational position of the rotor, the internal space of said motor including the internal portions thereof with the bearing means and being sealed off against the clean chamber containing the disk, and the rotational position sensor means being located outside the sealed off internal space of the motor.

2. A disk memory drive in accordance with claim 1, wherein the stator winding means and the magnet means extend for at least two-thirds of the axial extension thereof within the space surrounded by the disk mounting section.

3. A disk memory drive in accordance with claim 1, wherein the rotational position sensor means is disposed on a printed circuit board.

4. A disk memory drive in accordance with claim 3, wherein the printed circuit board additionally supports electronic commutation means for the electromagnetization of the stator.

5. A disk memory drive in accordance with claim 3, wherein the printed circuit board is supported by a stationary flange on the shaft.

6. A disk memory drive in accordance with claim 5, wherein the rotational position sensor means comprises connection leads which are led through the stationary flange.

7. A disk memory drive in accordance with claim 1, wherein the rotational position indicator means is mounted exteriorly of a motor cover which seals off the internal motor space.

8. A disk memory drive in accordance with claim 7, wherein the rotational position indicator means comprises permanent magnet means for creating a magnetic field with which said rotational position sensor means interacts.

9. A disk memory drive in accordance with claim 7, wherein the motor cover defines a disk storage drive support flange.

10. A disk memory drive in accordance with claim 7, wherein the cover forms a flange projecting radially from the hub for supporting the at least one storage disk.

11. A disk memory drive in accordance with claim 1, wherein the rotational position indicator means is mounted on a part of the hub which lies outside sealed motor internal space at a distance from the disk mounting section.

12. A disk memory drive in accordance with claim 11, wherein the rotational position indicator means is mounted on the side, facing away from the disk mounting section, of a flange of the hub projecting radially outwardly.

13. A disk memory drive in accordance with claim 1, wherein a flange serving to support the at least one storage disk is integrally connected with the hub, and wherein a member for supporting part of the bearing means is inserted into the hub and is at least approximately aligned with the flange in the axial direction.

14. A disk memory drive comprising: a brushless drive motor having a stationary shaft, a sealed internal space and a stator including winding means defining magnetically active parts of the drive motor and having a given axial extension, the motor having an outer rotor coaxially encircling the stator and a substantially cylindrical air gap defined between the stator and the rotor, the rotor including a hub and including permanent magnet means having a predetermined axial extension fixedly connected there with for magnetic interaction with said winding means; a disk mounting section provided on the hub for accommodating at least one storage disk located in a clean chamber surrounding said rotor, the mounting section along its axial length being adapted to extend through a central aperture of the storage disk, the stator winding means and the magnet means interacting therewith being disposed for at least half of the axial extension thereof within a space encircled by the disk mounting section of the hub; and a bearing support ring on the stationary shaft supporting bearing means for rotatably mounting the rotor and the hub on the shaft, the stator winding means being connected to lead-in conductors within the sealed internal space and the lead-in conductors being led out from the sealed internal motor space through the bearing support ring.

15. A disk memory drive in accordance with claim 14, wherein the stator winding means and the motor magnet means extend for at least two-thirds of the axial extension thereof within the space surrounded by the disk mounting section.

16. A disk memory disk in accordance with claim 14, wherein the rotor and the hub are connected with rotational position indicator means interacting with stationary rotational position sensor means for determining the rotational position of the rotor, the position sensor means being accommodated within the sealed internal space and the position sensor means being provided with connection means likewise being led out through the bearing support ring.

* * * * *

UNITED STATES PATENT AND TRADEMARK OFFICE
CERTIFICATE OF CORRECTION

PATENT NO. : 4,843,500
DATED : June 27, 1989
INVENTOR(S) : Elsässer, et al.

It is certified that error appears in the above identified patent and that said Letters Patent is hereby corrected as shown below:

On the face of the Patent under "Filed", change "April 14, 1989" to --April 14, 1987--.

Column 3, line 53, change "bearings" to --bearing--.

Column 4, line 15, delete "that".

Column 5, line 1, delete "as".

Column 7, line 57, change "the clear space" to --a clean chamber--.

Column 9, line 46, before "which" insert --in--.

Column 10, line 52, change "surounded" to --surrounded--.

Column 12, line 12, change "there with" to --therewith--.

Column 12, line 35, change "disk" to --drive--.

Signed and Sealed this

Twenty-eighth Day of August, 1990

*Attest:*

HARRY F. MANBECK, JR.

*Attesting Officer*     *Commissioner of Patents and Trademarks*